United States Patent [19]
Pollock et al.

[11] 3,887,345
[45] June 3, 1975

[54] GAS CHROMATOGRAPH INJECTION SYSTEM

[75] Inventors: Glenn E. Pollock, Belmont; Milton E. Henderson, Mountain View; Ralph W. Donaldson, Jr., Sunnyvale, all of Calif.

[73] Assignee: The United States of America as represented by the United States National Aeronautics and Space Administration, Washington, D.C.

[22] Filed: Feb. 27, 1974

[21] Appl. No.: 446,564

Related U.S. Application Data

[63] Continuation of Ser. No. 180,962, Sept. 16, 1971, abandoned.

[52] U.S. Cl. ................................................ 55/386
[51] Int. Cl. ............................................. B01d 15/08
[58] Field of Search .................... 55/67, 197, 386

[56] References Cited
UNITED STATES PATENTS

| | | | |
|---|---|---|---|
| 3,365,951 | 1/1968 | Jentzsch | 55/197 X |
| 3,408,793 | 11/1968 | Frazer | 55/197 |
| 3,475,964 | 11/1969 | Jenkins | 55/197 X |
| 3,511,029 | 5/1970 | Azarraga et al. | 55/67 |
| 3,626,761 | 12/1971 | Haruki et al. | 55/197 X |

*Primary Examiner*—John Adee
*Attorney, Agent, or Firm*—Darrell G. Brekke; Armand G. Morin, Sr.; John R. Manning

[57] ABSTRACT

An injection system for a gas chromatograph is provided wherein the sample to be introduced is placed in a chamber which may be cool and not under pressure and is then injected into the apparatus by changing the position of a valve and heating the chamber whereby the sample is volatilized and swept by a carrier gas into the analysis apparatus.

6 Claims, 6 Drawing Figures

GAS CHROMATOGRAPH INJECTION SYSTEM

The invention described herein was made by employees of the United States Government and may be manufactured and used by or for the government for governmental purposes without the payment of any royalties thereon or therefor.

CROSS REFERENCES TO RELATED APPLICATIONS

This is a continuation of application Ser. No. 180,962 filed Sept. 16, 1971, now abandoned.

BACKGROUND OF THE INVENTION

1. Field of the Invention
Gas chromatograph.
2. Description of the Prior Art

Gas chromatographs are well known for use in analyzing materials and are particularly valuable for analyzing materials when only very small samples are available. In the past, samples have ordinarily been introduced into such chromatographs by dissolving the sample in a suitable solvent and then utilizing a syringe needle of slender dimensions to puncture a septum of some pliable organic polymer. The needle, after puncturing the septum, is exposed to a hot zone under pressure. The plunger of the syringe is then pushed in, injecting the sample into the hot zone. The liquid is vaporized and a carrier gas, which is continually flowing in the direction of the column, sweeps the vaporized gases into the chromatographic column.

Such conventional injection systems have a number of disadvantages. These can be enumerated as follows:

A. The syringes which are used in such systems have a plunger which invariably becomes worn with time as the result of friction and/or the use of samples which tend to erode or corrode the plunger or barrel. When the parts become worn, the vaporized sample may escape out the plunger barrel, causing lower accuracy and reproducibility.

B. The sample is injected into a heated injector block which causes a pressure in all directions as soon as the neddle is inserted through the septum. A part of the sample can be lost if the syringe is worn in the least.

C. The losses of the syringe barrel are increased by injecting into a heated zone which has a high carrier gas pressure. As soon as the syringe is inserted in the orifice, the material in the syringe is subjected to the carrier gas pressure which can press the liquid or gas out through the plunger barrel. The high temperature of the usual injection block further increases this tendency. When the operator overcomes this pressure by pushing the plunger, the sample may be lost if the plunger is worn.

D. Another disadvantage is that most prior systems employ some form of a septum which is usually an organic polymer. These polymers wear out after repeated punctures, so that the life of the septum is relatively short. Further, since the polymer is heated to a relatively high temperature, it may be degraded by the high temperature and may bleed out compounds such as plasticizers which are used in the manufacture of the material. Such material may be swept through the gas chromatograph column, causing possible errors, both of a quantitative and qualitative nature.

E. Another disadvantage of the prior art system is that the injected solvent may obscure some sample peaks if the solvent volume is large. Further, when large quantites of solvent are used there is a tendency to disturb the liquid phase of the column. Naturally these effects grow greater as the quantity becomes greater.

F. Another disadvantage is that the sample may exist in a very dilute solution which requires the operator to either use a large volume of solvent for injection or to concentrate the sample prior to heating. Since very small volumes must be handled, a high volumetric error may be made even under ideal conditions.

G. Although some injectors have been designed which do not use the septum, they all require a valve of some type and ordinarily the valve is one utilizing exotic materials and frequently is very difficult to construct. The valves are ordinarily heated and upon being degraded, give rise to many of the difficulties outlined above in conjunction with the system of using a septum.

SUMMARY OF THE INVENTION

The present invention employs a small injector chamber which can be made in various configurations in which the sample is placed. The sample is placed in the chamber while the chamber while the chamber is not under pressure and is not heated. Thus, there is no chance of leakage caused by either pressure or heat. Even if a syringe is used to inject the sample into the sample chamber, it lasts almost indefinitely since it is not exposed to a high temperature or pressure during the sample addition.

Another advantage of the present invention is that there need be no organic polymer as a septum so that the difficulties associated with septums, outlined above, cease to exist. Further, there are no O-rings or glands which might leak or bleed, causing erroneous results.

The only moving part in the whole system is a single valve of the two position rotary type and this valve is not subjected to heat or to the sample. The valve is not critical and even should it leak somewhat, it will not contribute to inaccurate results.

In accordance with the present invention very dilute samples can be analyzed by placing a large volume of solvent with the sample in the sample chamber, evaporating the solvent from the sample with carrier gas in reverse flow mode, at the same time depositing the sample on the injector's inner surface. The injector can then be positively closed and the sample flash heated and the carrier gas turned on to the inject mode to sweep the vaporized sample into the column.

The system of the present invention also lends itself to a great variation in volume. Thus, for example, the volume injected can be extremely small and the dead volume very low so it has the potential of giving better resolution.

The device of the present invention also has great flexibility, since if one desires to use the septum, the opening to the injector can be provided with a septum and the sample inserted into the injector through the septum while the injector pot is hot or cold, with or without the carrier gas flowing. Thus, the present system is completely flexible.

The device of the present invention lends itself to manual and automatice operation and/or remote control.

DESCRIPTION OF THE PREFERRED EMBODIMENTS

Figure 1:
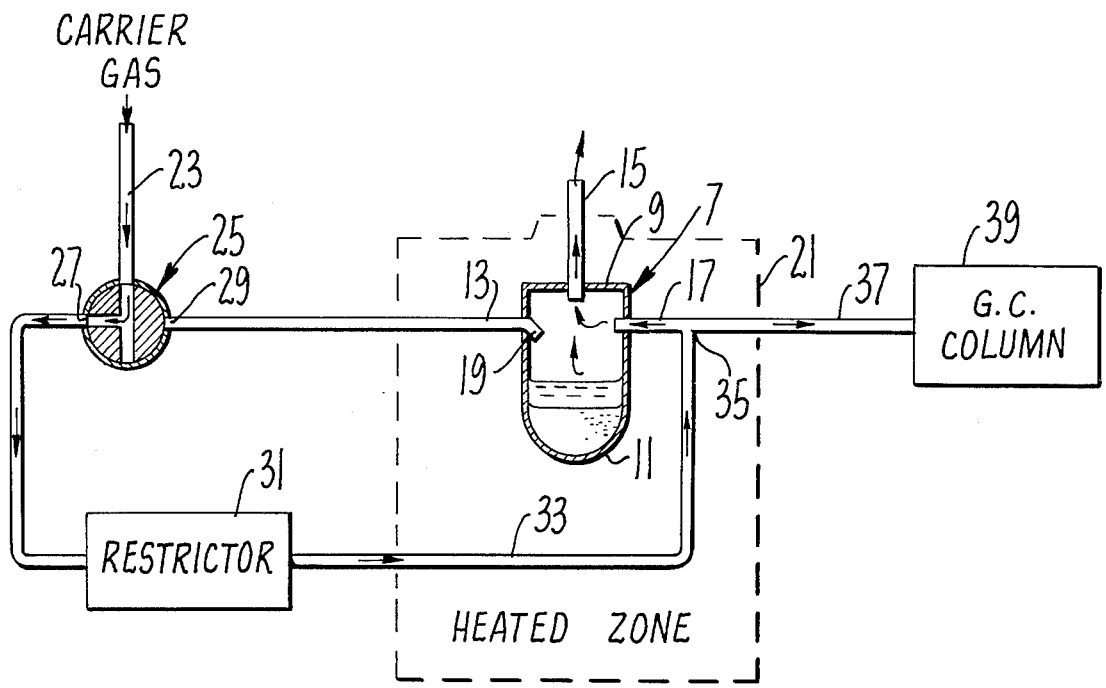
FIG. 1 is a side view of an injector embodying the present invention.
Figure 2:
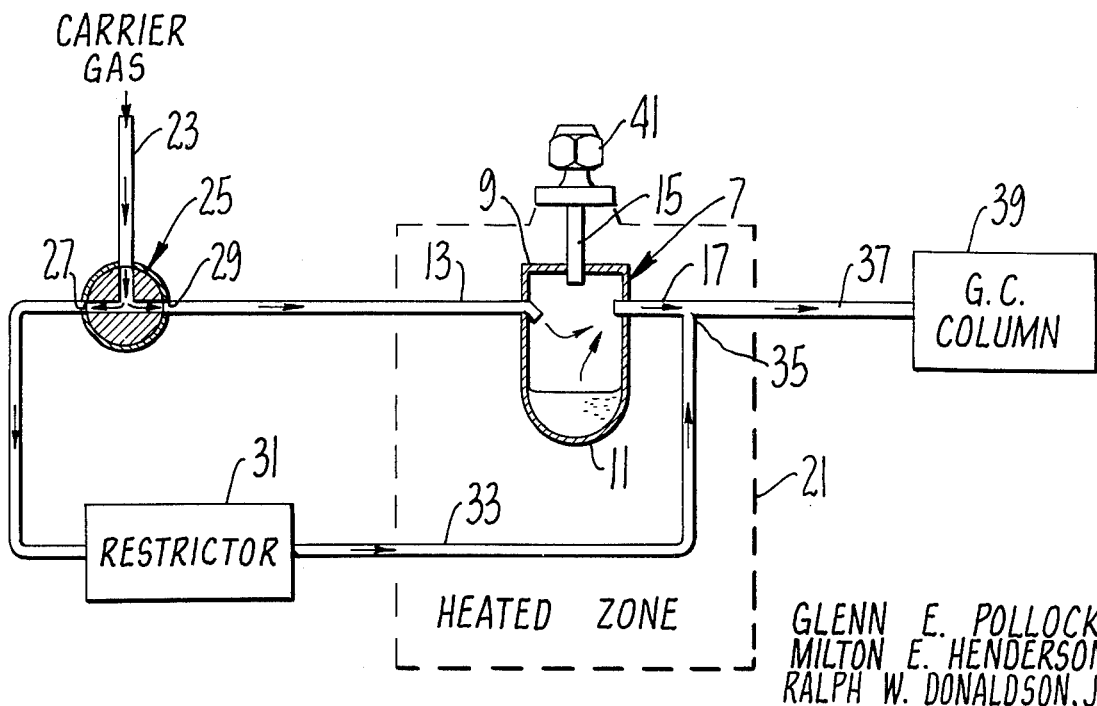
FIG. 2 shows the structure of FIG. 1 with a sample being injected into the chromatographic column.

Referring to the drawings by reference characters there is shown in FIG. 1 an embodiment of the invention wherein an injection chamber 7 is employed, having a flat top 9 and a hemispherical bottom 11. The size of chamber 7 can vary from a few microliters to a few hundred microliters. Chamber 7 is provided with three openings namely, 13, 15, and 17. It will be noted that the opening 13 has a tube 19 which enters the chamber and is directed downwardly to prevent a direct passage of gas from the tube 13 to the opening 17. The structure thus far described is placed in some form of zone generally designated 21 so that it can be flash heated. Direct resistance heating of the injector 7, radiant heating and hot air heating are all suitable. A source (not illustrated) of a suitable carrier gas is provided such as helium, hydrogen, nitrogen, or argon and this enters the system through line 23. Line 23 leads to a two-way valve 25 having outlet ports 27 and 29. Port 29 leads to line 13 while port 27 leads through a restrictor 31 and then through line 33 to a tee connection 35, one leg of the tee leading to line 17 and the injection chamber and the other leg of the tee leading through line 37 to the gas chromatograph column 39.

In operation, the sample would first be placed in the chamber 7 through opening 15. At the time the sample is placed in the chamber 7, it is unheated and under no pressure from the carrier gas. After the sample is placed in the injection chamber 7, valve 25 is opened so that the gas from line 23 flows only through line 27. The gas passing through the chamber through line 17 will sweep the solvent out through line 15. After the solvent has been evaporated, line 15 is closed in any suitable manner such as by the cap 41. At the same time valve 25 is turned so that carrier gas can flow out through both ports 27 and 29 and zone 21 is flash heated. Thus, the gas flows through line 13 over the sample in the chamber 7 and, sweeps the sample through line 17 and line 37 into the chromatograph 39 for analysis. A small portion of the gas from line 23 will pass through restrictor 31 through the tee joint 35 and into the column 39. It will be seen from this description that the sample is placed in the chamber at the time the chamber is cold and not under pressure so that the usual difficulties with the septum are avoided. The chamber itself can be used for the evaporation of the solvent so that the solvent for the sample need not pass through the chromatograph, avoiding the errors which frequently result from the presence of too much solvent in the chromatograph.

Although this is a preferred method of operation, it is not necessary to drive off the solvent in a separate step. If desired, line 15 can be closed as soon as the sample is in injector 7 and all the material in the chamber 7 passed through the chromatograph.

Figure 3:
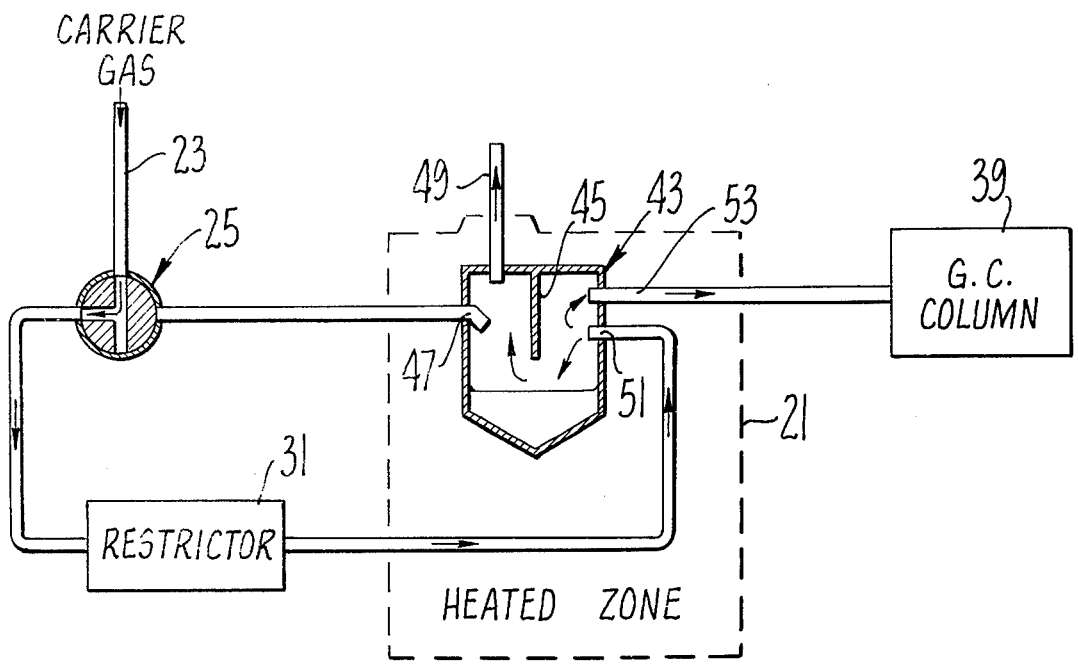
FIG. 3 shows another embodiment of the invention wherein a cylindrical chamber is used for injection.
Figure 4:
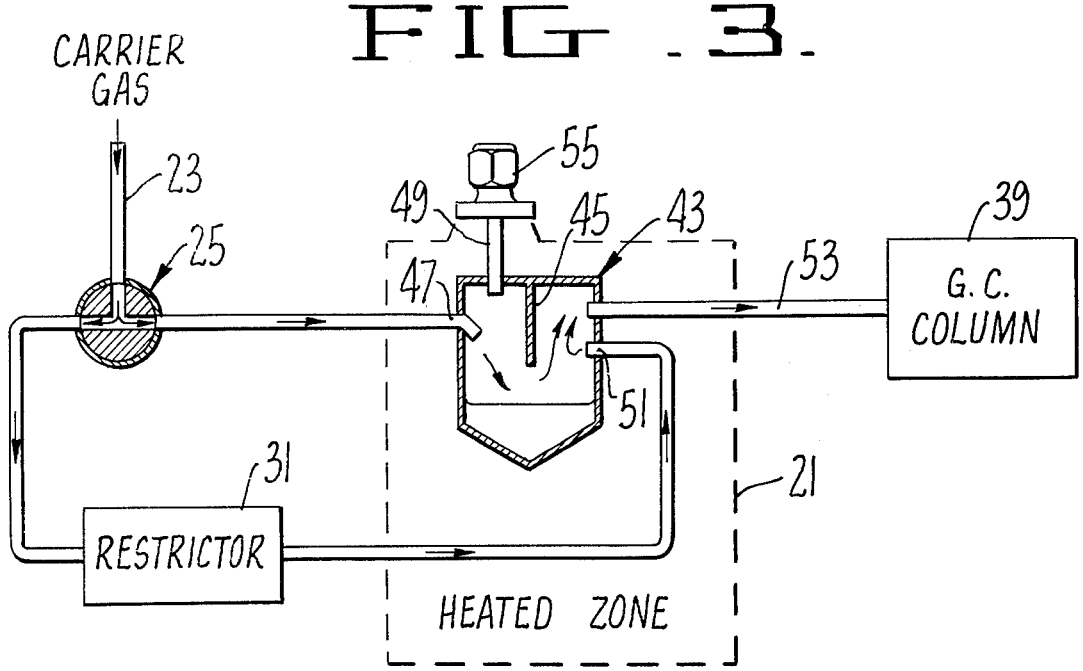
FIG. 4 shows the structure of FIG. 3, while a sample is being injected into the chromatograph column.
Figure 5:
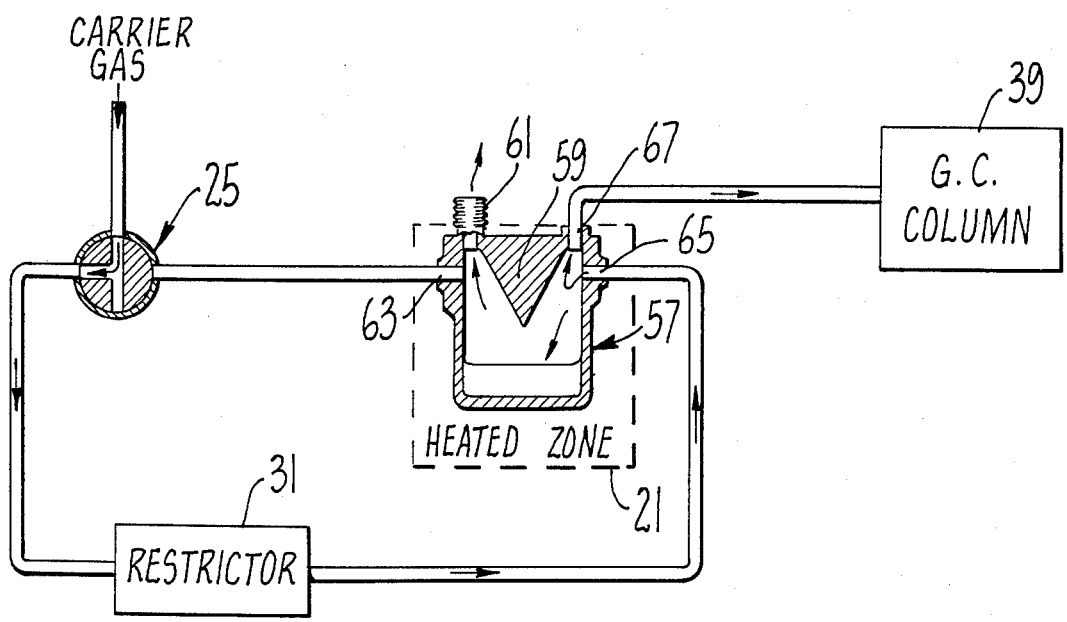
FIG. 5 shows another embodiment of the invention wherein a flat or rectangular injection chamber is employed.
Figure 6:
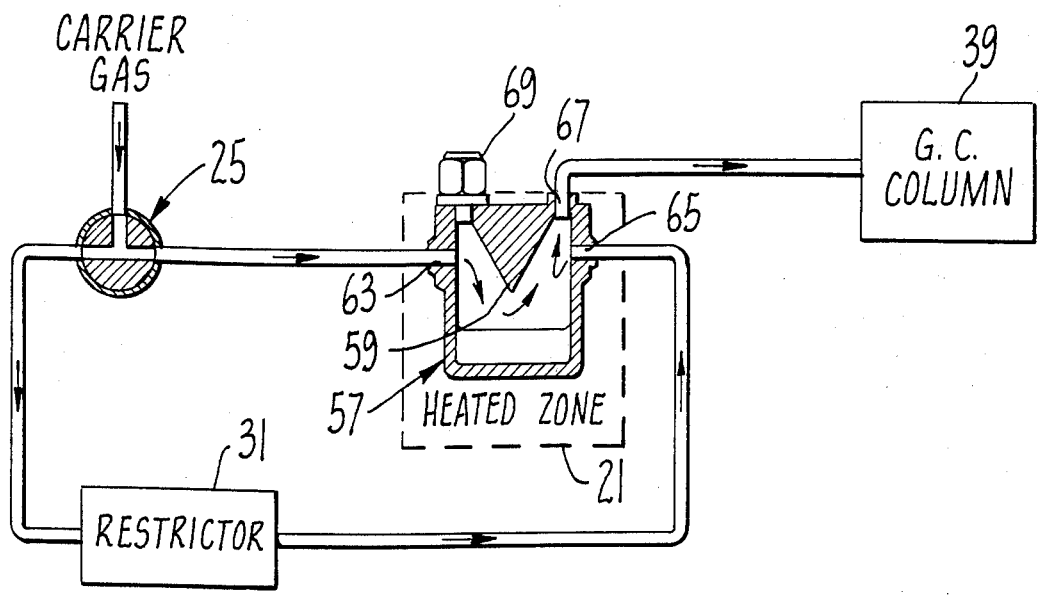
FIG. 6 shows the structure of FIG. 5 while a sample is being injected.

In FIGS. 3 and 4, a somewhat similar system is used except for the configuration of the injector chamber and the configuration of the piping leading to and from the chamber. Here the chamber 43 is in the form of a cylinder having a conical bottom and has a baffle 45 at approximately the center thereof. A direct gas inlet 47 provided from the valve 25 and a sample inlet tube 49, both on one side of the baffle 45. On the opposite side of the baffle 45 is placed an inlet tube 51 for carrier gas and an outlet tube 53, leading to the gas chromatograph 39. It will be seen that the tee connection previously used is no longer employed and the gas from the restrictor flows directly into the chamber 43. However, the method of operation is the same as previously described. First the sample is loaded into the chamber 43 then gas is admitted by valve 25 through the restrictor 31 and the opening 51. The solvent is driven out through tube 49. When the solvent has been driven out, the tube 49 is closed as by the cap 55 and the valve 25 turned so the gas can flow through line 47 as well as through restrictor 31, the injector being flash heated to volatilize the sample and the gas sweeping the sample through line 53 into the chromatograph 39.

We claim:

1. An injection system for a gas chromatographic column comprising in combination:
    a. an injection chamber for receiving a sample to be analyzed;
    b. valve means for controlling the flow of carrier gas;
    c. said chamber having three conduits leading into said chamber, a first conduit for inserting a sample into said chamber and for venting gas and solvent, a second conduit connected through a restrictor to said valve means and to said chamber for injecting carrier gas into said chamber, and a third conduit connected to said valve means and said chromatographic column for injecting gas into said chamber and for sweeping a vaporized sample into said chromatographic column;
    d. means for closing said 1st conduit; and
    e. flash heating means for heating said chamber and for vaporizing said sample.

2. The structure of claim 1 including a baffle extending downwardly into said injection chamber and separating said first and second conduits from said third conduit for preventing direct flow of gas and vapor between said first and second conduits and said third conduit and vice versa.

3. The structure of claim 1 wherein said injection chamber is in the form of a hemisphere having a rounded bottom and a flat top.

4. The structure of claim 1 wherein said injection chamber is in the form of a cylinder having a conical bottom.

5. An injection system for a gas chromatographic column comprising in combination:
    a. an injection chamber for receiving a sample to be analyzed;
    b. valve means controlling the flow of carrier gas to said chamber;
    c. said chamber having four conduits leading into said chamber, a first conduit for inserting a sample into said chamber and for venting gas and solvent, a second conduit connected to said valve means and said chamber for injecting carrier gas into said chamber, a third conduit connected through a restrictor to said valve means and to said chamber for injecting carrier gas into said chamber and for sweeping a vaporized sample into said column, and a fourth conduit connected to said chamber and said column for carrying vaporized sample and gas into said chromatographic column;

d. means for closing said first conduit; and e. flash heating means for heating said chamber and for vaporizing said sample.

6. The structure of claim 5 wherein the injection chamber is in the form of a rectangular member having a V-shaped baffle extending downwardly from the top of said chamber separating said first and second conduits from said third and fourth conduits for preventing direct flow of gas and vapor between said first and second conduits and said third and fourth conduits.

* * * * *